United States Patent [19]

Moline

[11] 4,067,479

[45] Jan. 10, 1978

[54] TWO PART MATERIAL METER-MIX DISPENSER APPARATUS

[75] Inventor: Clifford C. Moline, Malibu, Calif.

[73] Assignee: Products Research & Chemical Corporation, Burbank, Calif.

[21] Appl. No.: 600,579

[22] Filed: July 31, 1975

[51] Int. Cl.² .................. B65D 35/22; B67D 5/52; G01F 11/06; B29B 1/10

[52] U.S. Cl. .................. 222/94; 222/137; 222/334; 366/90

[58] Field of Search .................. 259/37, 43–46, 259/98; 222/326–327, 333–334, 137, 145, 94; 425/207–208

[56] References Cited

U.S. PATENT DOCUMENTS

| | | | |
|---|---|---|---|
| 2,634,889 | 4/1953 | Sherbondy | 222/327 |
| 3,159,312 | 12/1964 | Van Sciver | 222/326 |
| 3,190,619 | 6/1965 | Penney | 222/327 |
| 3,401,847 | 9/1968 | Downing | 222/334 |
| 3,575,319 | 4/1971 | Safianoff | 222/145 |
| 3,652,064 | 3/1972 | Lehnen | 425/208 |
| 3,767,085 | 10/1973 | Cannon | 222/327 |

Primary Examiner—Harvey C. Hornsby
Assistant Examiner—Robert Pous
Attorney, Agent, or Firm—Poms, Smith, Lande & Glenny

[57] ABSTRACT

A hand held two part material meter-mix-dispenser apparatus has a hand held body including a base mounting an air driven cylinder means in association with a double plunger assembly and a pair of cartridge receiving barrels with means for hingedly mounting the barrels to the base so that when in hinged open position, the barrels are positioned to easily receive a pair of cartridges containing different parts of a material to be mixed and when moved into hinged closed position automatically locate such cartridges in association with the double plunger assembly for simultaneous exuding of the materials of the two cartridges through a mixing head mounted on the apparatus body. Air driven mixing means are provided in the mixing head to dynamically mix the materials under pressure being forced through the mixing head via disposable conduits running from the two cartridges during operation of the dual plunger assembly. The mixing head assembly is a disposable component of a kit including disposable material containing cartridges and conduits which are easily assembled and retained upon the apparatus body for metering, mixing and dispensing a material comprising two initially separately stored parts.

8 Claims, 12 Drawing Figures

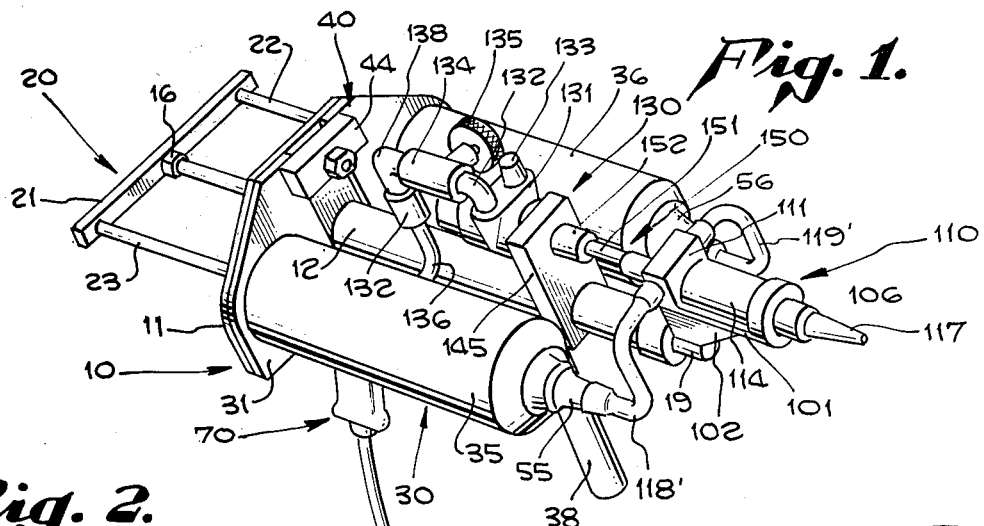
Fig. 1.
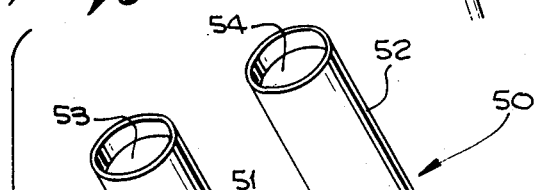
Fig. 2.
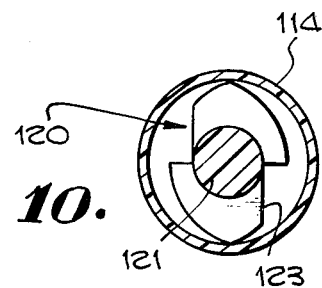
Fig. 10.
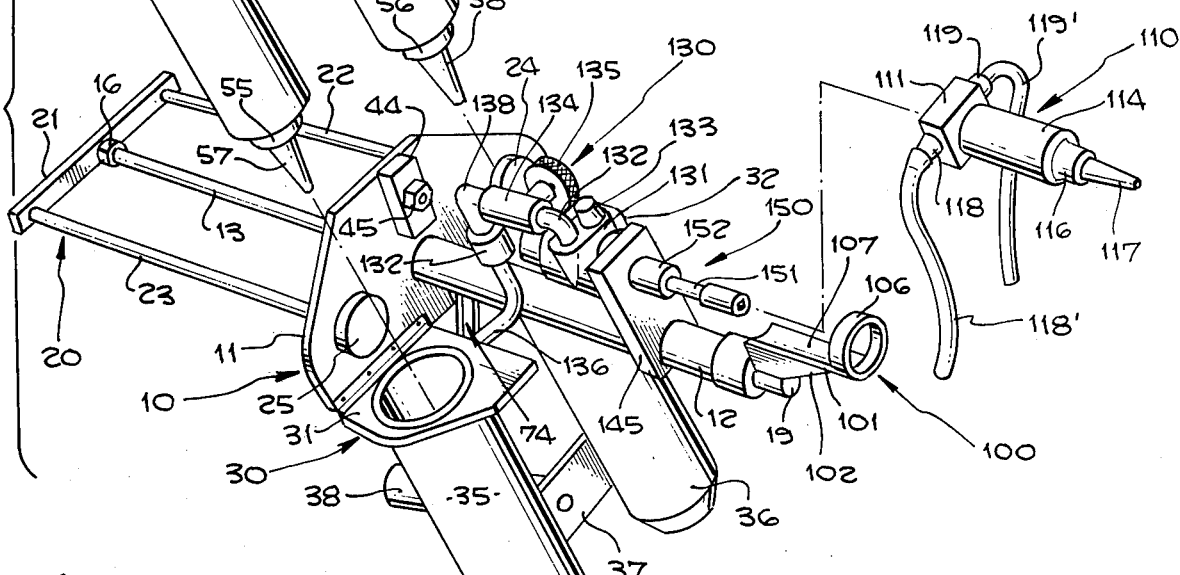
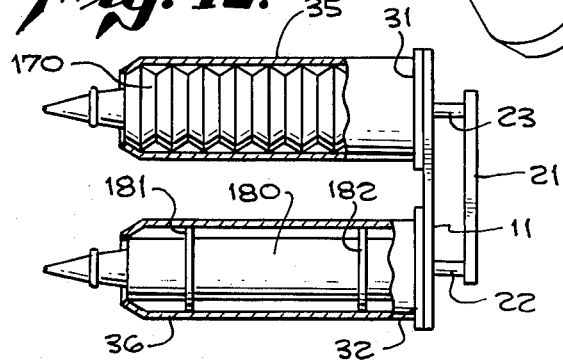
Fig. 12.
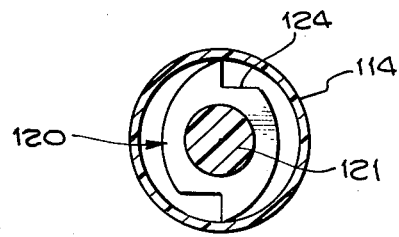
Fig. 11.

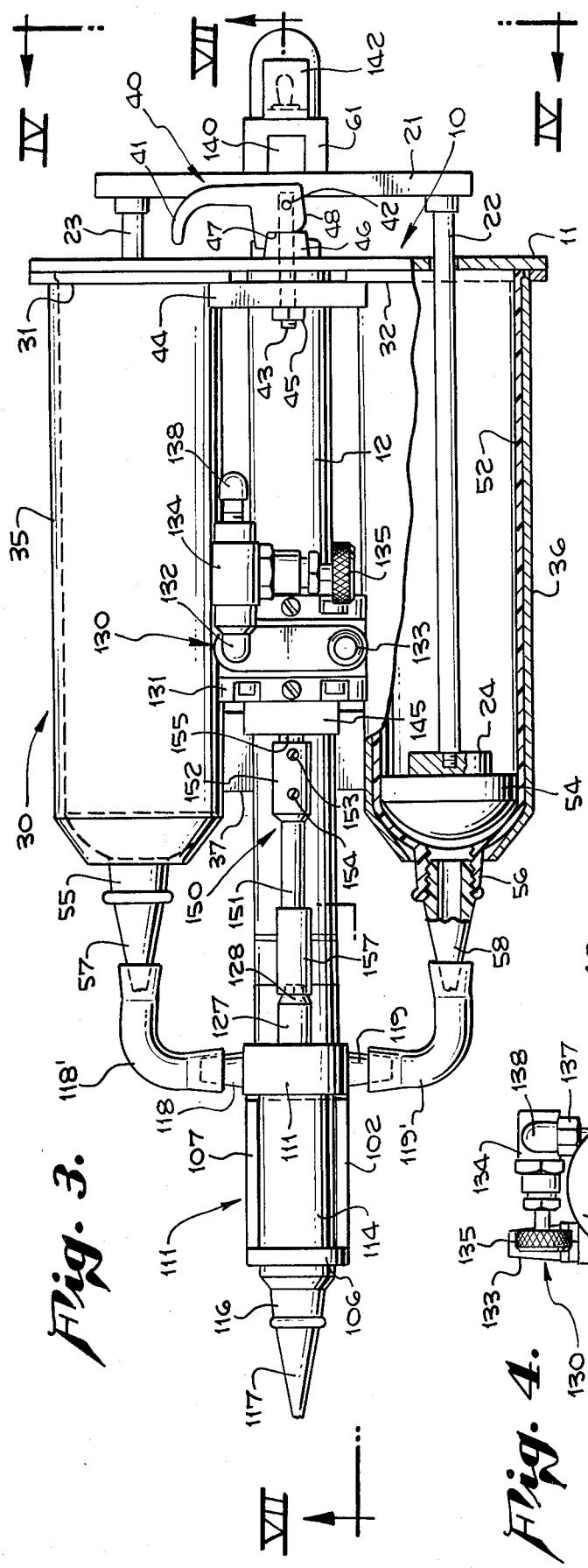

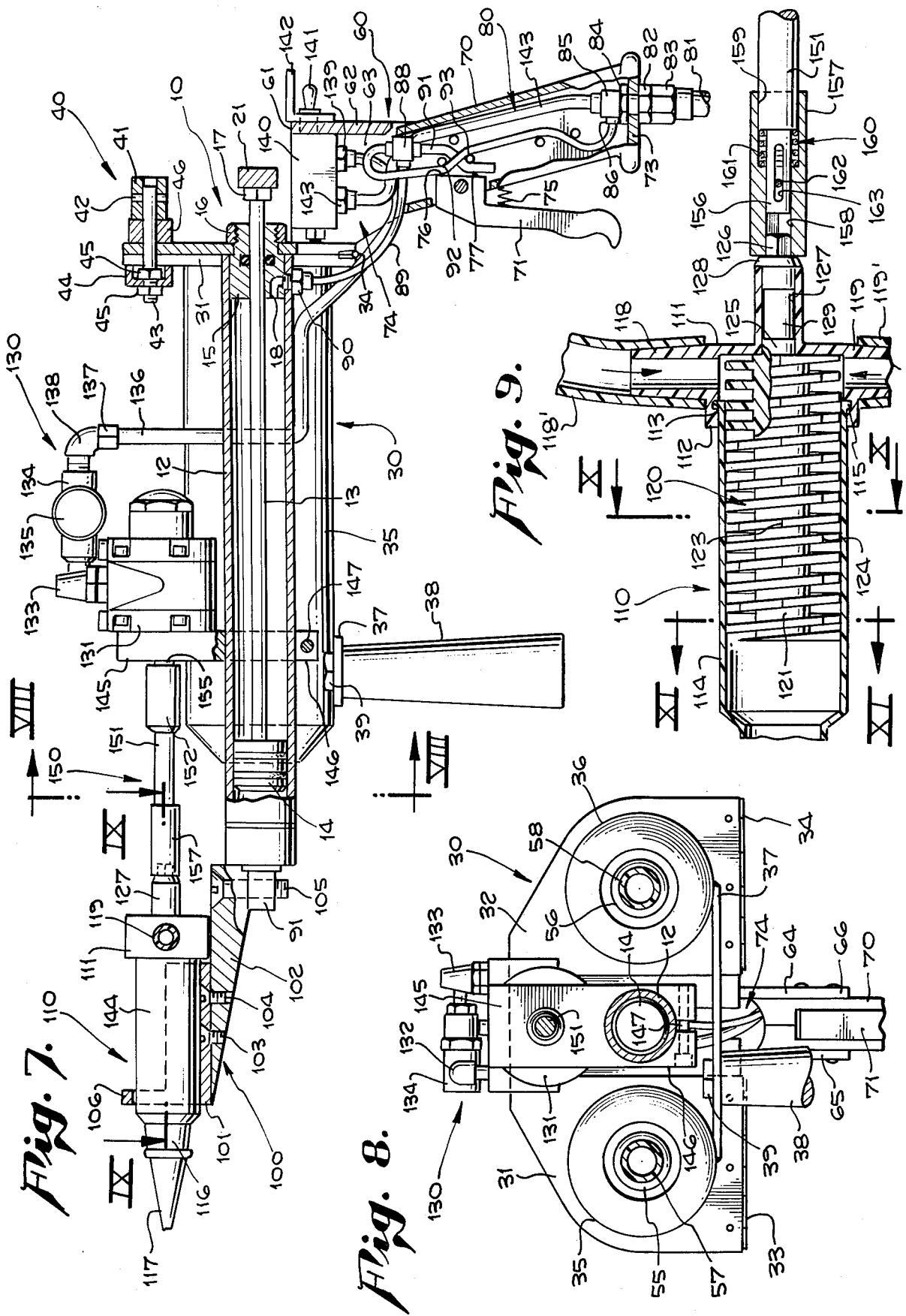

TWO PART MATERIAL METER-MIX DISPENSER APPARATUS

BACKGROUND OF THE INVENTION

The present invention relates in general to apparatus for metering, mixing and dispensing materials and particularly to air powered and operated material dispensing devices.

Heretofore, it has been common to employ hand operated air powered dispenser devices or "guns" for selectively dispensing one-part sealant, adhesive or other material applications from disposable plastic cartridges having rear end closing movable plungers and forward end nozzle mounting apertures by application of air pressure or ram pressure on the cartridge plunger as in the prior U.S. Pat. No. 3,813,012. In that U.S. patent, a particular air control and valve means including flexible tubular conduits acted upon by a spring biased trigger actuator provides for application of air pressure to the cartridge plunger. However, the air powered sealant dispenser of U.S. Pat. No. 3,813,012 and other similar single cartridge dispenser devices are not suitable for metering, mixing and dispensing materials which must be stored in two parts, in separate cartridges, prior to use. By way of example, various rigid foam insulation materials, such as a plyether urethane foam comprises a two part, carbon dioxide low foam system which cures at room temperature to a rigid, closed cell, foamed insulation within a relatively few hours time. The two part components, however, may have a shelf life when stored in unopened disposable plastic cartridges at normal room temperatures of some 6 months time. It is therefore necessary to store the two part components separately, and then just prior to application meter the respective parts in desired proportions, mix the two parts together and then exude the mixture into a desired location. Other types of materials having separately stored base and accelerator components require similar handling preparatory to application.

Because of the permanent damage a mixed two part material may do to a dispensing apparatus after curing and setting of the material, time consuming and expensive clean up operations must be utilized with any device capable of metering and mixing such materials. Disposable storage and mixing cartridges have therefore been developed heretofore such as in U.S. Pat. Nos. 3,164,303; 3,153,531 and 3,144,966. The approach of these patents has been to provide a disposable cartridge having initially separate storage areas for two part material components with provision for initially mixing and then exuding the materials from the cartridge. From the nature of the approach, the capacity of such cartridges and the flexibility thereof has been limited. Various manual steps have also been required for initially mixing and then exuding the two part materials contained within the disposable cartridge assembly.

SUMMARY OF INVENTION

It is therefore a primary object of the present invention to disclose and provide a hand held portable mixing dispenser apparatus capable of metering, mixing and dispensing a variety of two part materials in greater quantities than presently easily available from a single cartridge, which utilizes low cost disposable cartridges and other associated disposable components which may be supplied in kit form for use in association with repeated use of the hand held apparatus to which the disposable components may be assembled or removed.

It is another object of the present invention to disclose and provide a hand held two part material dispensing apparatus as in the foregoing object wherein the mounting of disposable cartridges and the positioning thereof relative to air operated means for exuding the cartridge contents is easily accomplished.

It is a still further object of the present invention to disclose and provide a two part material dispensing apparatus as in the foregoing objects wherein a disposable mixing means is provided in association with the apparatus for receiving the contents of two cartridges on a predetermined metering relationship under action of a first air powered means acting on the cartridges and includes a dynamic mixing of such two part material under the operation of a second air powered means operable from a single air pressure source.

These and other objects of the present invention are preferably accomplished by providing a hand held two part material dispenser apparatus including a pair of cartridge receiving barrels open at opposite ends to receive a material containing and dispensing cartridge through one end thereof with a nozzle end of the cartridge protruding through the opposite end of the barrel and a plunger portion of the cartridge facing the open end of the barrel. A double ram assembly is provided including a pair of ram heads provided for concurrent movement under the operation of an air cylinder means against the plungers of the two cartridges for concurrent collapsing of the cartridges. A mixing head mounting and retaining means is provided on the apparatus for removably mounting and retaining a mixing head, whereby a pair of material containing cartridges, mixing head and interconnecting conduits may be assembled to the dispenser apparatus for metering, mixing and dispensing two part materials and be thereafter removed from the apparatus for disposal; the dispenser apparatus is thus reusable with replacement cartridges, mixing head and interconnecting conduits which may be provided in kit form.

The pair of cartridge receiving barrels are preferably provided with means for hingedly mounting each of such barrels to a base portion of the apparatus. By operating associated fastening means, the cartridge receiving barrels may be hinged to an open position to easily receive a pair of material containing cartridges, and when hinged to closed position, position the cartridges in alignment with the ram heads of the dual ram assembly for exuding the cartridge contents simultaneously upon operation of the single air cylinder means.

The mixing head assembly is preferably provided in cartridge like configuration for easy mounting to the mixing head mounting and retaining means on the apparatus and is provided with a pair of inlets for connection by the disposable conduits to the cartridge nozzles. Internal mixing means, driven by an external air driven motor is preferably provided in order to dynamically mix the two part material being forced through the mixing head under action of the dual ram assembly.

A more complete understanding of the hand held two part material dispenser apparatus and associated disposable component kit for metering, mixing and dispensing two part materials, as well as additional objects thereof, will become known to those skilled in the art from a consideration of the following detailed description of a preferred exemplary embodiment thereof. Reference will be made to the appended sheets of drawings, in which like numbers denote like parts, a brief description of such drawings being made hereinafter prior to such detailed description.

BRIEF DESCRIPTION OF THE DRAWINGS

FIG. 1 is a perspective view of a preferred exemplary embodiment of the hand held two part material dispenser apparatus in accordance with the present invention;

FIG. 2 is a perspective view of the apparatus of FIG. 1 shown with the cartridge receiving barrels in hinged open position and with the disposable cartridges, mixing head and associated conduits shown prior to assembly thereto;

FIG. 3 is a plan view of the apparatus of FIGS. 1 and 2;

FIG. 4 is a rear view of the apparatus of FIG. 3 taken therein along the plane IV—IV;

FIG. 5 is a detail view of the fastening means of the apparatus of FIGS. 1 through 4;

FIG. 6 is a detail view as in FIG. 5 shown the fastening means in a release position;

FIG. 7 is a side elevational view, partially in section, of the apparatus of FIG. 3 taken therein along the plane VII—VII;

FIG. 8 is a generally front, cross section, view of the apparatus of FIG. 7 taken therein along the plane VIII—VIII;

FIG. 9 is a detail section view of the mixing head and associated coupling means of the apparatus of FIG. 7 taken therein along the plane IX—IX;

FIG. 10 is a section view of the mixing head of FIG. 9 taken therein along the plane X—X;

FIG. 11 is a section view of the mixing head of FIG. 9 taken therein along the plane XI—XI; and FIG. 12 is a detail view of alternative embodiments of material containing cartridges utilizable in the apparatus of FIGS. 1 through 11.

DESCRIPTION OF THE PREFERRED EMBODIMENT

Referring now to FIGS. 1 and 2, initially, the preferred exemplary embodiment of hand held two part material dispensing apparatus in general includes a hand held gun-like body or base, indicated generally at 10, which mounts a double plunger assembly indicated generally at 20 and a cartridge holding assembly, indicated generally at 30. The cartridge holding assembly, including barrels 35 and 36, may be held in the hinged closed position of FIG. 1 by fastening means indicated generally at 40. On release of such fastening means, the cartridge holding assembly may be hinged to the cartridge open position of FIG. 2. As seen generally in FIGS. 4, 7 and 8, a rear handle assembly, indicated generally at 60, is provided upon the apparatus body with an air supply and control means incorporated therein indicated generally at 80. As will be described in detail subsequently, operation of trigger 71 causes air flow to the air cylinder 12 for moving the associated dual plunger assembly, indicated generally at 20, against cartridges 51 and 52 when assembled within barrels 35 and 36. A mixing head mounting and retainer assembly is indicated generally at 100, as best seen in FIGS. 3 and 7, for mounting the mixing head assembly indicated generally at 110. The mixing head includes a mixing member indicated generally at 120 and is driven by an air motor drive indicated generally at 130. The aforementioned air control means is adapted to supply air pressure to the air motor drive indicated generally at 130 from the same air source provided for driving the air cylinder. A drive shaft assembly, indicated generally at 150, provides for a releasable driving coupling between the air motor drive indicated generally at 130 and the mixing head assembly indicated generally at 110.

Now, more specifically, the hand held gun-like body of the exemplary dispenser apparatus, in accordance with the present invention, includes a base plate 11 upon which an air driven cylinder means 12 is mounted. As best seen in FIG. 7, the air cylinder means 12 includes a cylinder rod 13 and piston 14, which together with the surrounding cylindrical housing, are mounted by end plug fitting 15 and nut 16 to the base plate 11.

A double plunger assembly, indicated generally at 20, is provided for concurrent actuation of the cartridges 51 and 52. As best seen in FIG. 3, such double plunger assembly includes a rear cross bar 21 connecting a first plunger rod 22 and a second plunger rod 23 for concurrent movement. Rod 22 is provided with a ram head 24 while rod 23 is provided with ram head 25. Rods 22 and 23 may be mounted to the cross bar in any suitable manner, said rods in the exemplary embodiment having threaded ends turned into appropriately drilled and tapped holes in the cross bar 21 with lock nuts 26 and 27 holding them in assembled relation. As best seen in FIGS. 1 and 2, the rear end of the air cylinder rod 13 is suitably threaded and turned into a drilled and tapped hole provided in cross bar 21 with a lock nut 17 holding them in assembled relation. As will be described subsequently, air pressure directed through cylinder port or inlet 18 is applied to the rear side of piston 14 to cause operation of the dual plunger assembly in a concurrent power stroke for exuding the two part materials of the assembled cartridges. The return stroke of the dual assembly may be accomplished by merely manually reversing the stroke of the assembly.

The cartridge holding assembly, indicated generally at 30, as best seen in FIGS. 1 and 2, is hingedly mounted to the base plate 11 for hinging movement between the hinged closed position of FIG. 1 and the hinged open position of FIG. 2, the latter facilitating insertion of the cartridges 51 and 52. In the exemplary embodiment, the cartridge holding assembly includes the provision of a right side hinged plate 31 and left side hinged plate 32 which are independently hinged by right hinge means 33 and left hinge 34, respectively. Cartridge holders or barrels are mounted to these individually hinged plates with right barrel 35 being secured to plate 31 and left barrel 36 being secured to plate 32. A bridging means, including spanner 37, is provided to cause concurrent hinging movement between the individually mounted barrels. A forward handle 38, offset toward the right side of the apparatus, may be mounted to spanner 37 by an appropriate fastening means including the nut 39 as best seen in FIGS. 7 and 8.

Fastening means are provided for holding the cartridge holding assembly in hinged closed position during operation of the dual plunger assembly in a power stroke. In the exemplary embodiment, such fastener means includes the fastener assembly indicated generally at 40, in FIGS. 1 through 4 and in detail in FIGS. 5 and 6, including a clamping handle 41 pivotally mounted by pin 42 to rod 43. As seen in FIG. 7, a lock pawl 44, which may be of channel cross section, is apertured to fit over a threaded end of rod 43 and held in assembled relation thereto by lock nuts 45 and 45'. Rod 43 is journalled in a boss 46, of generally square configuration, secured to plate 11, as by welding or the like. When handle 41 is in the closed position of FIGS. 3 and 7, the cam surface 47 of the handle abuts the rear face of boss 46 in order to tightly hold the lock pawl 44 across the individually hinged barrel mounting plates 31 and 32. Rotation of handle 41 is prevented by interference between a tail or stop portion 49 on the handle and a side surface of boss 46. However, as seen in FIG. 5, on pivoting of handle 41 about pivot pin 42, the pawl 44 is released from its tight engagement with plates 31 and 32 since the radial distance from pin 42 to handle surface 48 is appropriately smaller than the radial distance from pin 42 to cam surface 47. Rotation of handle 41 thereafter, as seen in FIG. 6, turns pawl 44 into a release position allowing hinging movement of the cartridge holding assembly, indicated generally at 30, to the open position of FIG. 2.

As is contemplated within the present invention, the two part materials to be dispensed by the apparatus are provided in disposable plastic cartridges indicated generally at 50. A pair of cartridges, 51 and 52 are used with the present apparatus which preferably include a collapsible construction as by a forward collapsing movement of rear plungers 53 and 54 under the exertion of pressure thereagainst. As seen in FIG. 2, such cartridges preferably are provided with a nozzle mounting portion 55 and 56, respectively, at a forward end to receive and mount appropriate initially closed nozzles 57 and 58, respectively. As seen in FIG. 2, when the cartridge holding assembly, indicated generally at 30, is in hinged open position, the individual material containing cartridges 51 and 52 may be simply slid into the barrels 35 and 36 in a manner somewhat similar to the loading of shells into a shot gun. Barrels 35 and 36 are open at opposite ends in order to allow the cartridge nozzles 57 and 58, as well as the nozzle mounting portions 55 and 56, respectively, to protrude from the forward ends of the barrels as seen in FIG. 1. The rearwardly facing plungers 53 and 54 are thereby positioned within barrels 35 and 36, facing the rear open ends of the barrels in alignment with ram heads 25 and 24, respectively, automatically upon closing of the cartridge holding assembly into the hinged closed position of FIG. 1 and locked in such position through the operation of the fastener assembly indicated generally at 40 as hereinbefore described.

It is intended that the dispenser apparatus of the present exemplary embodiment be easily hand held for portable use by an operator in remote locations where more typical types of two part material metering, mixing and dispensing devices are not easily utilizable. In accordance therewith, a rear handle assembly, indicated generally at 60, is provided in addition to the forward handle 38 to give a two handled, gun-like configuration to the apparatus to facilitate a two handed manipulation of the apparatus as more fully described hereinafter. Referring particularly to FIGS. 4, 7 and 8, the exemplary embodiment of rear handle assembly includes a mounting bracket 61 bolted by appropriate fastening means to support plate 11. As seen in FIG. 7, bracket 61 includes a rear wall 62, and as best seen in FIGS. 4 and 8, a right side wall 63, left side wall 64 and depending side wall extensions including right extension 65 and left extension 66 receiving and mounting a handle 70. Handle 70 may be formed in two halves of suitably molded plastic material and be riveted or otherwise fastened together between the bracket depending extensions 65 and 66 as seen in FIGS. 4 and 8.

Handle 70 is provided with a trigger 71 pivotally mounted on mounting pin 72 for operating air supply and control means, indicated generally at 80, to be described in detail hereinafter. The lower wall or base 73 of the handle is ported to receive a single air supply line and is open at its upper end, as indicated generally at 74, to facilitate passage of air lines therethrough. Trigger 71 is normally spring biased by spring 75 into the off position of FIG. 7.

The exemplary air supply and control means, indicated generally at 80, includes the provision of a single air supply line 81 adapted to be connected to a source of air under pressure, such as a compressor or the like. Line 81 is connected to a threaded fitting 82, mounted to handle base 73 by lock nut 84, via the line mounted nut 83. A hose adapter assembly 85 is mounted in fluid communication with line 81 interiorly of handle 70 to facilitate connecting different diameter internal air lines 87 and 143 to the single air supply line 81 as described more fully hereinafter.

As will now be described, the air supply and control means for air cylinder 12 includes the provision of flexible tubular conduits within handle 70 which may be pinched closed or allowed to expand open under the influence of trigger 71 in accordance with the invention and disclosure of U.S. Pat. No. 3,813,012, the disclosure of said patent being incorporated herein by reference. In the present embodiment, such flexible tubular conduits forming part of the valving means include the provision of flexible conduit 87, connected to hose adapter assembly 85 via clamp type fitting 86, run interiorly of handle 70 between an upper abutment surface 76 of trigger 71 and an abutment pin 92 on its way to air manifold 88. From air manifold 88, a supply line 89 continues out through handle opening 74 to fitting 99 connecting the supply line to the cylinder inlet 18. A flexible vent hose runs from an appropriate connection to air manifold 88 in a depending manner past abutment pin 93 as seen in FIG. 7. Normally, with trigger 71 biased in the direction of spring bias of 75 (clockwise in FIG. 7) the air supply line 87 will be pinched closed with the vent line 91 allowed to be open. The chamber within air cylinder 12 is thus in a vented condition. However, on squeezing handle trigger 71 toward handle 70, against the bias of spring 75, the vent hose 91 will be pinched closed by abutment surface 77 of trigger 71 squeezing hose 91 against abutment pin 93. At the same time, the air supply line 87 will be freed from the aforedescribed pinched condition against pin 92 and, due to its inherent flexibility, will expand to an open condition allowing air flow through line 87, manifold 88 and supply 89 to the cylinder inlet 18. By thus operating manually movable trigger 71, the air cylinder 12 may be operated to cause the associated plunger assembly to push the cartridge plungers in a cartridge collapsing manner to cause exuding of the cartridge contents.

The mixing head mounting and retainer assembly, indicated generally at 100, and as best seen in FIGS. 2 and 7, includes a mixing head retainer member 101 secured to a retainer mounting 102 by screws 103 and 104. Retainer mounting 102 is mounted by screw 105 to a mounting block 19 provided on the forward end of the cylinder 12. The mixing head retainer 101 is provided with a forward end retainer ring 106 and a generally concave seat 107 to facilitate receiving a cartridge configured mixing head, indicated generally at 110.

The mixing head assembly, indicated generally at 110, preferably includes a housing base 111 having an apertured boss 112 provided with an inner bore circumferential notch 113 which receives a cartridge configured housing body 114 by a snap fit between the cartridge open end peripheral lip 115 and the base notch 113, as best seen in FIG. 9. As seen in FIGS. 3 and 7, the cartridge housing 114 is provided with a nozzle mount portion 116 with an initially closed nozzle 117. Housing base 111 is provided with a right side inlet 118 and left side inlet 119 to be connected to disposable flexible conduit 118' and 119', respectively.

Referring again to FIG. 9, the mixing head assembly, indicated generally at 110, in the exemplary embodiment is provided with a driven internal mixing member comprising a mixing helix indicated generally at 120. Such mixing member includes a central shaft 121 about which is formed a helical thread 122 having various configurations of cut out portions 123 and 124 as seen in FIGS. 9, 10 and 11. It is intended that the direction of the helix thread should be chosen so that during normal rotation thereof, the turning of the helix promotes a material movement in a direction opposite the normal flow of the two part materials from the inlets 118 and 119 toward the outlet provided by nozzle 117. The rearward portion of the mixing member central shaft 121 is provided with a reduced diameter extension 125, having a hex end 126, which is journalled in a housing base journal sleeve 127. A chamfered head portion 128 is provided on shaft extension 125 having an outside major diameter slightly greater than the inside diameter of journal sleeve 127 so that the head 128 may be pushed from left to right in FIG. 9 through sleeve 127 and thereafter hold the mixing member shaft journaled for rotation in sleeve 127. Appropriate lubrication material, such as grease, may be placed in the space formed between the further reduced diameter portion 129 of shaft extension 125 and the surrounding sleeve.

An air motor drive, indicated generally at 130, is provided for operating the mixing member of the mixing head to dynamically mix the materials being otherwise exuded through the mixing head due to the pressure of the plunger assembly upon the associated cartridges. As seen in FIG. 3, when the cartridges 51 and 52 are assembled within the respective barrels of the apparatus, the nozzle ends may be snipped off and the disposable conduits 118' and 119' merely press fit over the open ends of the nozzles. Then, on operation of the trigger 71 when air line 81 is connected to a source of air under pressure, the plunger assembly, indicated generally at 20, will force the cartridge plungers 53 and 54, respectively, from right to left in FIG. 3, in a cartridge collapsing manner, to force the two parts of the material to be mixed through the respective conduits 118' and 119' and, by virtue of such pressure, through the mixing head assembly, indicated generally at 110, out nozzle 117, which of course should be sectioned from its free end at a desired distance to produce the desired size of bead of material exuded in otherwise known manner. However, as contemplated in the exemplary embodiment, the mixing of the two parts in the mixing head is facilitated through the rotation of the mixing member, indicated generally at 120, by the associated air motor drive indicated generally at 130.

In the exemplary embodiment, the air motor drive, indicated generally at 130, includes the provision of an air motor 131 having an air inlet line 132 (FIGS. 1 and 2) and an otherwise conventional outlet muffler 133. An inlet valve 134 is provided, having valve control knob 135, for selective regulating the flow of air through the supply line 136 to the air motor, line 136 being connected by fitting 137 to elbow 138 communicating with inlet valve 134. The opposite end of air supply line, as seen in FIG. 7, is connected by fitting 139 to a toggle valve 140 mounted within the handle mounting bracket 61. Toggle valve 140 may be operated by a manual switch 141 for turning the air supply to air motor 131 completely on or off, valve 134 being provided to modulate the air supply as desired. A thumb guard 142 is provided above switch 141. Fitting 144 on the underside of the toggle valve 140 connects supply line 143 which runs interiorly of handle 70 from the aforedescribed hose adapter assembly 85 communicating with the single air line power source 81.

The air motor 131 is preferably mounted upon the apparatus base and specifically by a motor mounting bracket 145, as seen in FIGS. 7 and 8. Bracket 145 is ported at its upper end to receive a circular bearing portion of the air motor in a snug fit mounting relation, as seen in FIG. 8, and is in turn mounted upon the air cylinder 12 via a lower split and apertured portion 146. An appropriate fastening means is provided with the lower split end 146, such as a threaded clamp pin 147, for securing the mounting bracket on cylinder 12 for mounting the air motor centrally of cartridge barrels 35 and 36 and slightly above a horizontal plane through their major axes.

The drive shaft assembly, indicated generally at 150, provides for the selective connection of the air motor output shaft and the hex end 126 of the mixing member, indicated generally at 120. Referring initially to FIG. 3, the drive shaft assembly includes a drive shaft 151 having a rearward end mounting socket 152 secured by set screws 153 and 154 to the air motor output shaft 155. At the forward end of drive shaft 151, and as best seen in FIG. 9, a coupling member 157 is provided with an open ended hex bore 158 to receive and drivingly engage hex end 126 of the mixing head assembly. A hex configured extension 156 of drive shaft 151 also extends into hex bore 158 of coupling member 157 to provide for a driving relation between shaft 151 and coupling member 157. As seen in FIG. 9, the coupling member 157 is further provided with a larger bore 159 to circular configuration to receive the circular shaft 151 and to provide a spring chamber 160, receiving compression spring 161, between the coupling member 157 and shaft 151, biasing coupling member 157 toward an extended position for engagement with the mixing head shaft hex end 126 as seen in FIG. 9. In order to facilitate the retension of the coupling member 157 on shaft 151, its outward movement under the bias of spring 161 is limited by a pin and slot limiting means comprising the provision of dowl pin 162 bridging bore 158 of the coupling member and the entraining slot 163 formed in the shaft extension 156.

From the foregoing, it can be seen that a hand held two part material dispensing apparatus has been disclosed which is repeatedly usable with disposable material contacting components. A disposable component kit is disclosed for use with the apparatus including a pair of cartridges of selectable size to provide a desired metering of two different materials out of associated nozzles of the cartridges upon concurrent collapsing thereof due to the operation of the dual plunger assembly as aforedescribed. In the preferred exemplary embodiment, the cartridges 51 and 52 are shown of equal size and configuration. An equal metering of the materials of the two cartridges is thus effected when such cartridges are utilized with the disclosed apparatus. However, referring to FIG. 12, it is contemplated that cartridges of different configurations and size may be utilized in combination with each other in order to provide for different relative metering of two part materials. By way of example, the collapsible bellows type of bottle (which may be a 16 ounce bottle) may be provided in one of the barrels 35. In the companion barrel 36, a reduced diameter cartridge 180, (which may be a one tenth gallon cartridge) may be provided so that a predetermined relative metering of the material parts of the two cartridges is automatically effected upon operation of the dual plunger assembly. As seen in FIG. 12, the smaller diameter cartridge 180 may be snugly fitted within a standard size barrel 36 through the use of spacer plates 181 and 182, which may be configured to fit about the cartridge 180 and snugly within the barrel 36.

In addition, a disposable mixing head assembly has been disclosed for removable assembly to the gun-like dispenser apparatus which provides for a connection of the mixing head inlets via disposable conduits to the nozzle outlets of the two cartridges assembled to the apparatus. When in assembled relation as seen in FIG. 1, the materials to be metered, mixed and exuded only contact the disposable components, which are easily separable from the dispenser apparatus body as seen in FIG. 2.

Having thus described an exemplary embodiment of hand held two part material meter-mix-dispense apparatus with disposable material handling components, it should be apparent to those skilled in the art that other modifications and variations thereof may be made without departing from the scope and spirit of the invention which is defined by the following claims.

I claim:

1. A hand held two part material dispenser apparatus comprising:
    a hand held body including a base mounting a single air driven cylinder means and a double plunger assembly in operative relation for actuation of said plunger assembly by said single cylinder means;
    a pair of cartridge receiving cylindrical barrels and means for hingedly mounting each of said barrels to said base, said barrels each being adopted to receive a separate material dispensing cartridge when in hinged open position and positioning two such cartridges relative to said plunger assembly when said pair of barrels are in hinged closed position for simultaneously exuding the materials of such two cartridges upon operation of said single cylinder means;
    air driven mixing means mounted on said base and including a material receiving housing having two inlets and a single outlet for mixing materials received in two parts through said two inlets and dispensing a mixture thereof through said outlet;
    flexible conduit means for connecting said two cartridges to said two housing inlets; and
    air supply means including a single air line and means for selectively connecting said line to said air driven cylinder means and said air driven mixing means for air pressure operation of said plunger assemby and mixing means from a single air line power source.

2. The hand held two part material dispenser apparatus of claim 1 and further comprising:
    drive means for said mixing means including a drive shaft driven off of an output shaft of an associated air motor;
    an output shaft associated with said mixing means and extending outwardly of said mixing means; and
    releasable connecting means for releasably connecting said drive shaft and mixing means input shaft for selective operation and said mixing means by said associated air motor.

3. The hand held two part material dispenser apparatus of claim 2 wherein:
    said releasable connecting means comprises a spring biased coupling member mounted on said drive shaft having a mating socket means for receiving an outer end of said input shaft in driving relation, said coupling member being movable against its spring bias to release said input shaft to facilitate removal of said mixing head from said mounting and retaining means of said apparatus.

4. A hand held two part material dispenser apparatus adapted to use disposable material containing cartridges, mixing head and interconnecting conduits comprising:
    a pair of cartridge receiving tubular barrels, each open at opposite ends to receive an individual separate material containing and dispensing cartridge through one end thereof with a nozzle end of the cartridge protruding through the opposite end of each said barrel and with a plunger portion of such cartridge facing said barrel one end;
    a double ram assembly including a pair of ram heads mounted on the ends of a pair of ramrods connected for concurrent movement and means for mounting said ram assembly to place said ram heads in operative driving relation to said cartridge plungers;
    air operated cylinder means for operating said ram assembly;
    a mixing head mounting and retaining means for removably mounting and retaining a mixing head;
    air motor means for operating said mixing head; and
    air control means for selectively controlling air pressure from a source thereof to said cylinder means and motor means, whereby a pair of material containing cartridges, mixing head and interconnecting conduits may be assembled to said dispenser apparatus for metering, mixing and dispensing two part materials, thereafter removed from said apparatus for disposal with the apparatus being reusable with replacement cartridges, mixing head and interconnecting conduits.

5. The hand held two part material dispenser apparatus of claim 4 wherein:
    said air control means includes the provision of a single main air supply line for connection to a source of air under pressure with manifold and conduit means for directing such air selectively to said air operated cylinder means for operation of said plunger assembly independently of supplying air to said motor means for operating said mixing head from a single pressure source via a single main air supply line to said apparatus.

6. The hand held two part material dispenser apparatus of claim 5 and further comprising:
    a driven mixing member provided internally of said mixing head and having an input drive shaft extending outwardly of said mixing head; and coupling means for removably coupling an output shaft of said motor means to said input drive shaft of said mixing member.

7. The hand held two part material dispenser apparatus of claim 6 and further comprising:
means for hingedly mounting each of said barrels to a hand held base member, said barrels each being adapted thereby to receive a material dispensing cartridge when in hinged open position and positioning such cartridges relative to said plunger assembly when in hinged closed position.

8. The hand held two part material dispenser apparatus of claim 7 wherein:
said means for hingedly mounting said barrels comprises a pair of individually hinged barrel mounting plates;
said barrels are connected by bridging means for causing common hinging movement; and
a second handle means is associated with said barrels for holding the forward portion of the gun-like dispenser apparatus thus provided.

* * * * *